US011299261B2

(12) United States Patent
Kerr et al.

(10) Patent No.: US 11,299,261 B2
(45) Date of Patent: Apr. 12, 2022

(54) LANDING GEAR SYSTEM OPERATION

(71) Applicant: AIRBUS OPERATIONS LIMITED, Bristol (GB)

(72) Inventors: Sean Kerr, Bristol (GB); David Marles, Bristol (GB)

(73) Assignee: Airbus Operations Limited, Bristol (GB)

( * ) Notice: Subject to any disclaimer, the term of this patent is extended or adjusted under 35 U.S.C. 154(b) by 117 days.

(21) Appl. No.: 16/799,896

(22) Filed: Feb. 25, 2020

(65) Prior Publication Data

US 2020/0277044 A1    Sep. 3, 2020

(30) Foreign Application Priority Data

Feb. 28, 2019 (GB) ...................................... 1902739

(51) Int. Cl.
*B64C 25/30* (2006.01)
*B64C 13/16* (2006.01)
*B64C 25/28* (2006.01)
*B64D 45/04* (2006.01)

(52) U.S. Cl.
CPC .............. *B64C 25/30* (2013.01); *B64C 13/16* (2013.01); *B64C 25/28* (2013.01); *B64D 45/04* (2013.01)

(58) Field of Classification Search
CPC ......... B64C 25/10; B64C 25/26; B64C 25/28; B64C 25/30
See application file for complete search history.

(56) References Cited

U.S. PATENT DOCUMENTS

2010/0012779 A1* 1/2010 Collins ................... B64C 25/24
244/102 R
2020/0262588 A1* 8/2020 Nakhjavani ........ B64D 45/0005

FOREIGN PATENT DOCUMENTS

| EP | 2 902 315 | | 8/2015 | |
| EP | 3 339 167 | | 6/2018 | |
| EP | 3339167 | A1 * | 6/2018 | ............. B64C 13/16 |
| EP | 3 418 189 | | 12/2018 | |

OTHER PUBLICATIONS

European Search Report cited in EP 20159484.3 dated Jul. 17, 2020, 8 pages.
Combined Search and Examination Report for GB Application No. 1902739.0 dated Aug. 14, 2019, 6 pages.

* cited by examiner

*Primary Examiner* — Richard G Davis
(74) *Attorney, Agent, or Firm* — Nixon & Vanderhye P.C.

(57) ABSTRACT

An aircraft landing gear control system 1000 configured to be operably connected to one or more landing gear systems 30, 40 of an aircraft. The aircraft landing gear control system includes a controller 20 configured to: send at least one output for initiating operation of the one or more landing gear systems; determine whether at least one landing gear system of the one or more landing gear systems has failed to operate correctly in response to the at least one output; and determine at least one remedial action to be taken, when the controller determines that the at least one landing gear system has failed to operate correctly.

20 Claims, 2 Drawing Sheets

LANDING GEAR SYSTEM OPERATION

RELATED APPLICATION

This application claims priority to United Kingdom Patent Application GB 1902739.0 filed Feb. 28, 2019, the entirety of which is incorporated by reference.

TECHNICAL FIELD

The present invention relates to operation of aircraft landing gear systems, and particularly to aircraft landing gear control systems configured to be operably connected to one or more landing gear systems of an aircraft, methods of controlling one or more landing gear systems of an aircraft using a controller of the aircraft, and controllers for an aircraft landing gear control system.

BACKGROUND

In some known aircraft, a landing gear system comprises a landing gear that is held in an extended position when the aircraft is on the ground and is stowed at a retracted position in a landing gear bay once the aircraft has taken off. Such stowage of the landing gear helps to reduce aircraft drag and noise and the risk of the landing gear being damaged in flight. The landing gear subsequently is extended to the extended position again before the aircraft lands. The landing gear system may comprise a landing gear bay door that at least partially covers the landing gear bay when closed, and is openable to enable movement of the landing gear between the retracted position and the extended position. Movement of the landing gear and the landing gear bay door is typically controlled by a pilot using cockpit flight controls of the aircraft, such as a landing gear control lever.

SUMMARY

A first aspect of the present invention provides an aircraft landing gear control system configured to be operably connected to one or more landing gear systems of an aircraft, the aircraft landing gear control system comprising a controller that is configured, in use, to: send at least one output for initiating operation of the one or more landing gear systems; determine whether at least one landing gear system of the one or more landing gear systems has failed to operate correctly in response to the at least one output; and determine at least one remedial action to be taken, when the controller determines that the at least one landing gear system has failed to operate correctly.

Optionally, the controller is configured, in use, to receive signals from one or more sensors of the aircraft; and to determine that the at least one landing gear system has failed to operate correctly on the basis of the one or more signals.

Optionally, the one or more sensors comprise one or more of: one or more position sensors for sensing a position of an element of the at least one landing gear system, one or more movement sensors for sensing movement of an element of the at least one landing gear system, one or more strain sensors for sensing strain in an element of the at least one landing gear system, one or more pressure sensors for sensing fluid pressure in an element of the at least one landing gear system, one or more flow rate sensors for sensing flow rate in an element of the at least one landing gear system, and one or more current sensors for sensing an electrical current being drawn by an element of the at least one landing gear system.

Optionally, the controller is configured, in use, to determine a period of time that has elapsed, since the controller sent the at least one output, without the controller receiving an indication that the at least one landing gear system has operated correctly; and to determine that the at least one landing gear system has failed to operate correctly on the basis of the period of time determined.

Optionally, the controller is configured, in use, to: determine one or more reasons for the at least one landing gear system to have failed to operate correctly; and determine the at least one remedial action to be taken, on the basis of the one or more reasons.

Optionally, the controller is configured, in use, to: determine the one or more reasons by a process comprising interrogating avionics of the aircraft.

Optionally, the controller is configured, in use, to: determine the one or more reasons by a process comprising interrogating one or more sensors of the aircraft.

Optionally, the one or more sensors comprise one or more of: one or more position sensors for sensing a position of an element of the at least one landing gear system, one or more movement sensors for sensing movement of an element of the at least one landing gear system, one or more strain sensors for sensing strain in an element of the at least one landing gear system, one or more pressure sensors for sensing fluid pressure in an element of the at least one landing gear system, one or more flow rate sensors for sensing flow rate in an element of the at least one landing gear system, and one or more current sensors for sensing an electrical current being drawn by an element of the at least one landing gear system.

Optionally, the controller is configured, in use, to: cause identification of the at least one remedial action to be output at a cockpit of the aircraft.

Optionally, the controller is configured, in use, to: cause initiation of the at least one remedial action.

Optionally, the controller is configured, in use, to: cause initiation of the at least one remedial action automatically, on the basis of the determination of the at least one remedial action to be taken.

Optionally, the aircraft landing gear control system comprises a user interface operable by a user to manually input a request to perform the at least one remedial action; the controller is communicatively coupled to the user interface; and the controller is configured, in use, to: receive, from the user interface, a signal indicative of user-operation of the user interface to input the request to perform the at least one remedial action; and cause initiation of the at least remedial action, on the basis of the signal.

Optionally, the controller is configured, in use, to: send the at least one output for initiating operation of the one or more landing gear systems according to a first procedure; and determine at least one remedial action to be taken that comprises sending at least one output for initiating operation of the at least one landing gear system according to a second procedure different to the first procedure.

Optionally, the second procedure comprises one or more of: operating at least a portion of the at least one landing gear system under the influence of gravity alone; operating the at least one landing gear system using avionics that are different to avionics used to operate the at least one landing gear system according to the first procedure; and actuating the at least one landing gear system using mechanics that are different to mechanics used to actuate the at least one landing gear system according to the first procedure.

Optionally, the at least one remedial action to be taken comprises one or more of: determining a flight plan; executing an aircraft manoeuvre; reattempting operation of the at least one landing gear system; and taking one or more actions to counteract asymmetry or pitching of the aircraft.

Optionally, the controller is configured, in use and prior to sending the at least one output, to determine that the one or more landing gear systems are to be operated.

Optionally, the controller is configured, in use, to determine that the one or more landing gear systems are to be operated on the basis of one or more inputs received at the controller from one or more sensors.

Optionally, the aircraft landing gear control system comprises a user interface operable by a user to manually input a landing gear system operation request; and the controller is communicatively coupled to the user interface and is configured, in use, to receive from the user interface an input indicative of user-operation of the user interface to input the landing gear system operation request, and to determine that the one or more landing gear systems are to be operated on the basis of the input.

Optionally, the operation of the one or more landing gear systems comprises extension, such as full extension, of one or more landing gears.

Optionally, the operation of the one or more landing gear systems comprises retraction, such as full retraction, of one or more landing gears.

A second aspect of the present invention provides a method of controlling one or more landing gear systems of an aircraft using a controller of the aircraft, the method comprising the controller: issuing at least one output for causing operation of the one or more landing gear systems; determining whether at least one of the one or more landing gear systems has failed to operate correctly in response to the at least one output; and determining at least one remedial action to be taken, when the controller determines that the at least one landing gear system has failed to operate correctly in response to the at least one output.

Optionally, the method comprises the controller: receiving signals from one or more sensors of the aircraft; and determining that the at least one landing gear system has failed to operate correctly on the basis of the one or more signals.

Optionally, the one or more sensors comprise one or more of: one or more position sensors for sensing a position of an element of the at least one landing gear system, one or more movement sensors for sensing movement of an element of the at least one landing gear system, one or more strain sensors for sensing strain in an element of the at least one landing gear system, one or more pressure sensors for sensing fluid pressure in an element of the at least one landing gear system, one or more flow rate sensors for sensing flow rate in an element of the at least one landing gear system, and one or more current sensors for sensing an electrical current being drawn by an element of the at least one landing gear system.

Optionally, the method comprises the controller: determining a period of time that has elapsed, since the controller issued the at least one output, without the controller receiving an indication that the at least one landing gear system has operated correctly; and determining that the at least one landing gear system has failed to operate correctly on the basis of the period of time determined.

Optionally, the method comprises the controller determining one or more reasons for the at least one landing gear system to have failed to have operated correctly; and determining the at least one remedial action to be taken, on the basis of the one or more reasons.

Optionally, the method comprises the controller determining the one or more reasons by a process comprising interrogating avionics of the aircraft and/or interrogating one or more sensors of the aircraft.

Optionally, the one or more sensors comprise one or more of: one or more position sensors for sensing a position of an element of the at least one landing gear system, one or more movement sensors for sensing movement of an element of the at least one landing gear system, one or more strain sensors for sensing strain in an element of the at least one landing gear system, one or more pressure sensors for sensing fluid pressure in an element of the at least one landing gear system, one or more flow rate sensors for sensing flow rate in an element of the at least one landing gear system, and one or more current sensors for sensing an electrical current being drawn by an element of the at least one landing gear system.

Optionally, the method comprises the controller causing identification of the at least one remedial action to be output at a cockpit of the aircraft.

Optionally, the method comprises the controller causing initiation of the at least one remedial action.

Optionally, the method comprises the controller causing initiation of the at least one remedial action automatically, on the basis of the determination of the at least one remedial action to be taken.

Optionally, the method comprises the controller receiving, from a user interface, a signal indicative of user-operation of the user interface to input the request to perform the at least one remedial action; and causing initiation of the at least remedial action on the basis of the signal.

Optionally, the method comprises the controller sending the at least one output for initiating operation of the one or more landing gear systems according to a first procedure; and determining at least one remedial action to be taken that comprises sending at least one output for initiating operation of the at least one landing gear system according to a second procedure different to the first procedure.

Optionally, the second procedure comprises one or more of: operating at least a portion of the at least one landing gear system under the influence of gravity alone; operating the at least one landing gear system using avionics that are different to avionics used to operate the one or more landing gear systems according to the first procedure; and actuating the at least one landing gear system using mechanics that are different to mechanics used to actuate the at least one landing gear system according to the first procedure.

Optionally, the at least one remedial action to be taken comprises one or more of: determining a flight plan; executing an aircraft manoeuvre; reattempting operation of the at least one landing gear system; and taking one or more actions to counteract asymmetry or pitching of the aircraft.

Optionally, the method comprises the controller determining that the one or more landing gear systems are to be operated, prior to sending the at least one output.

Optionally, the method comprises the controller: determining that the one or more landing gear systems are to be operated on the basis of one or more inputs received at the controller from one or more sensors.

Optionally, the method comprises the controller: receiving from a user interface an input indicative of user-operation of the user interface to input a landing gear system operation request; and determining that the one or more landing gear systems are to be operated on the basis of the input.

Optionally, the operation of the one or more landing gear systems comprises extension, such as full extension, of one or more landing gears or retraction, such as full retraction, of one or more landing gears.

A third aspect of the present invention provides a non-transitory computer-readable storage medium storing instructions that, if executed by a processor of a controller of an aircraft, cause the processor to carry out the method according to the second aspect of the present invention.

A fourth aspect of the present invention provides a controller for an aircraft landing gear control system, wherein the controller is configured to: perform one or more actions for initiating actuation of a landing gear system; and then determine one or more processes to be initiated, when the controller determines that the landing gear system has failed to actuate correctly as a result of the one or more actions having been performed.

A fifth aspect of the present invention provides an aircraft comprising the aircraft landing gear control system according to the first aspect of the present invention or the non-transitory computer-readable storage medium according to the third aspect of the present invention or the controller according to the fourth aspect of the present invention.

BRIEF DESCRIPTION OF THE DRAWINGS

Embodiments of the invention will now be described, by way of example only, with reference to the accompanying drawings, in which.

DETAILED DESCRIPTION

Often, actuation of each landing gear (and associated landing gear bay door, when provided) of an aircraft during a take-off or a landing procedure is initiated by a pilot manually operating cockpit flight controls, such as a landing gear control lever. Typically, operation of the cockpit flight controls causes one or more landing gear bay door actuators to drive movement of the landing gear bay door from a closed position to an open position, then one or more landing gear actuators to extend or retract the landing gear, and optionally then the one or more landing gear bay door actuators to drive movement of the landing gear bay door from the open position back to the closed position. Such operations of the landing gear system can involve plural actuators, sensors and avionics, and therefore be complex in their nature.

The take-off and landing procedures are two of the highest workload flight phases for flight crew. Conventionally, after operating the cockpit flight controls, the flight crew wait to receive a confirmation that the landing gear system has successfully and correctly operated. If the landing gear system fails to operate correctly, then the flight crew will troubleshoot the issue and decide on remedial action to be taken. This activity can take the full attention of one of the flight crew.

Therefore, some examples discussed herein are concerned with reducing the amount of time that flight crew need to dedicate to such activity when one or more landing gear systems fail to operate correctly. The technology discussed herein has application at least in civil aircraft, military aircraft, and unmanned aerial vehicles (UAVs). Some examples discussed herein are implementable within these areas of application when there is only one flight crew or no flight crew at all.

Figure 1:
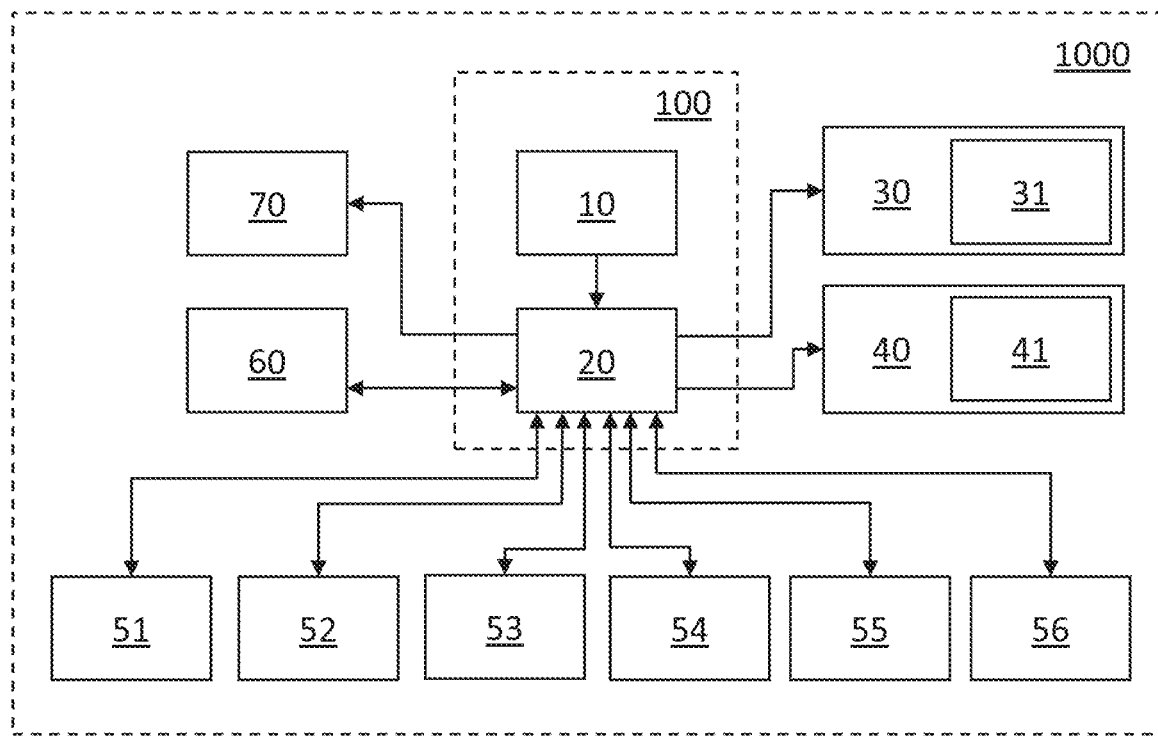
FIG. 1 is a schematic view of an example of an aircraft system.

FIG. 1 shows a schematic view of an example of an aircraft system. The aircraft system 1000 may be comprised in an aircraft, or may be supplied separate from the rest of an aircraft but be able to be incorporated into an aircraft. The aircraft system 1000 comprises an aircraft landing gear control system 100, one or more landing gear systems 30, 40 comprising respective landing gears 31, 41, a plurality of sensors 51-56, avionics 60, and a remedial action identifier 70. Each of these elements is described below in more detail.

Each of the one or more landing gear systems 30, 40 may comprise a landing gear bay door (not shown) and one or more landing gear bay door actuators (not shown) for moving the landing gear bay door from a closed position towards an open position. Each of the landing gear bay doors is associated with one of the landing gears 31, 41 and a landing gear bay (not shown). Each landing gear bay door would at least partially cover the associated landing gear bay when in the closed position. This way, the landing gear bay door would help to protect the associated landing gear bay, and the associated landing gear 31, 41 when stowed in the bay, from debris that might be thrown towards the bay while the aircraft is moving on the ground or in flight. Each of the one or more landing gear bay door actuators may take any suitable form, such as a hydraulic actuator, an electro-hydraulic actuator, or an electric actuator. The one or more landing gear bay door actuators may also be for moving the landing gear bay door from the open position towards the closed position, or an alternative mechanism may be provided for such closure. In some cases, the landing gear bay doors may be omitted. For example, the landing gear 31, 41 may remain exposed, at least to an extent, when retracted.

Each of the one or more landing gear systems 30, 40 may comprise one or more landing gear bay door locks (not shown) for locking the landing gear bay door of the respective landing gear system 30, 40 in the closed position. Each of the one or more landing gear bay door locks may take any suitable form, such as a hydraulically-actuated lock, an electro-hydraulically-actuated lock, or an electrically-actuated lock. In some cases, the one or more landing gear bay door locks may be omitted. For example, the landing gear bay doors may be held in the closed position by the one or more landing gear bay door actuators.

Each of the one or more landing gear systems 30, 40 may comprise one or more landing gear actuators (not shown) for moving the respective landing gear 31, 41 from an extended position towards a retracted position. The landing gears 31, 41 are at least partially positioned in the landing gear bays when in the retracted position. Each of the one or more landing gear actuators may take any suitable form, such as a hydraulic actuator, an electro-hydraulic actuator, or an electric actuator. The one or more landing gear actuators may also be for moving the landing gear from the retracted position towards the extended position, or an alternative mechanism may be provided for this extension.

Each of the one or more landing gear systems 30, 40 may also comprise one or more landing gear locks (not shown) for locking the respective landing gears 31, 41 in position when retracted. Each of the one or more landing gear locks may take any suitable form, such as a hydraulically-actuated lock, an electro-hydraulically-actuated lock, or an electrically-actuated lock. In some cases, the one or more landing gear locks may be omitted. For example, the landing gears 31, 41 may be held in the retracted position by the one or more landing gear actuators.

The sensors 51-56 may comprise one or more position sensors 51 for sensing a position of an element of the one or more landing gear systems 30, 40, such as a landing gear, a landing gear bay door, a lock, or an actuator. The sensors 51-56 may comprise one or more movement sensors 52 for sensing movement of an element of the one or more landing gear systems 30, 40, such as a landing gear, a landing gear bay door, a lock, or an actuator. The sensors 51-56 may comprise one or more strain sensors 53 for sensing strain in an element of the one or more landing gear systems 30, 40, such as a landing gear, a landing gear bay door, a lock, or an actuator. The sensors 51-56 may comprise one or more pressure sensors 54 for sensing fluid pressure in an element of the one or more landing gear systems 30, 40, such as a landing gear actuator, a landing gear bay door actuator, or a pipe leading thereto or therefrom. The sensors 51-56 may comprise one or more flow rate sensors 55 for sensing fluid flow rate in an element of the one or more landing gear systems 30, 40, such as a landing gear actuator, a landing gear bay door actuator, or a pipe leading thereto or therefrom. The sensors 51-56 may comprise one or more current sensors 56 for sensing an electrical current being drawn by an element of the one or more landing gear systems 30, 40. In some cases, any or all of these sensors 51-56 may be omitted, or other types of sensor for sensing a characteristic or status of one or more elements of the one or more landing gear systems 30, 40 may be provided.

The avionics 60 may be used to control the landing gear systems 30, 40, such as operation of the landing gear actuator(s), landing gear lock(s) (when provided), landing gear bay door actuator(s) (when provided), and landing gear bay door lock(s) (when provided). The avionics 60 typically provide sequencing logic, output drive to power solenoids such as hydraulic solenoids, monitor sensors, and monitor or provide indications to the cockpit. In some examples, the avionics may monitor sensors (such as sensors 51-56), and apply logic to determine the nature of a fault based on the output of the sensors monitored.

The skilled reader will have knowledge of the various components and sub-systems that may be included in the one or more landing gear systems 30, 40, and how the one or more landing gear systems 30, 40 may operate, and so further detail of possible features of the landing gear systems 30, 40 will be omitted for brevity. However, even from this brief discussion, it will be appreciated that each of the landing gear systems 30, 40 may comprise numerous components and movable parts, that a characteristic or status of some or all of these components or parts may be sensed by the sensors 51-56, and that the system of all these elements may be complex.

The aircraft landing gear control system 100 is operably connected to the one or more landing gear systems 30, 40, and comprises a user interface 10 and a controller 20 that is communicatively coupled to the user interface 10. Preferably, the user interface 10 is a cockpit flight control. The user interface 10 may take any suitable form, such as a user-movable device, a touchpad, a touchscreen, a gesture-operable device, a voice-operable device, or any combination thereof. Such a user-movable device may comprise a lever, such as a landing gear control lever. Alternatively, the user-movable device may comprise a device other than a lever, such as a switch, a button, a dial, a knob, or the like.

The controller 20 is configured, in use, to send at least one output for initiating operation of the one or more landing gear systems 30, 40. The, or each, output may, for example, be an electrical or electronic signal. The at least one output may be for initiating extension of the landing gear(s) 31, 41 of the landing gear systems 30, 40, or for initiating retraction of the landing gear(s) 31, 41, for example.

The controller 20 may be configured, in use, to beforehand determine that the one or more landing gear systems 30, 40 are to be operated. For example, the controller 20 may be configured, in use, to determine that the landing gears 31, 41 are to be extended, such as during a landing procedure. Alternatively, the controller 20 may be configured, in use, to determine that the landing gears 31, 41 are to be retracted, such as during a take-off procedure. This determination by the controller 20 may be automatic or may be user-instigated.

For example, in the former scenario, the controller 20 may be configured, in use, to determine that the one or more landing gear systems 30, 40 are to be operated on the basis of one or more inputs received at the controller 20 from one or more sensors (not shown). Such sensor(s) may, for example, sense a speed of the aircraft, an angle of rotation of the aircraft, the aircraft being off the ground, a distance between the aircraft and the ground, the aircraft having a positive rate of climb, a position of a flight control surface of the aircraft, a distance between the aircraft and a runway or airport, or the aircraft being at a certain geographical location. The controller 20 may be configured to determine that the one or more landing gear systems 30, 40 are to be operated solely on the basis of one or more inputs received from such sensor(s). Example sensors for sensing whether the aircraft is off the ground include sensors for sensing landing gear strut extension, sensors for sensing landing gear wheel speed or torque, and sensors for sensing height of the aircraft above the ground (such as proximity sensors or altitude meters). Other suitable sensors will be apparent to the skilled reader.

On the other hand, in the latter scenario, the user interface 10 may be operable by a user (such as a pilot) to manually input a landing gear system operation request, and the controller 20 may receive an input from the user interface 10 indicative of user-operation of the user interface 10 to input the landing gear system operation request, and then determine that the one or more landing gear systems 30, 40 are to be operated on the basis of the input. The user-operation of the user interface 10 may comprise movement of a landing gear control lever. The landing gear system operation request may be a request to extend the landing gears 31, 41 or to retract the landing gears 31, 41, for example.

The landing gear extension process can take one of many forms. In some examples, it comprises causing one or more landing gear bay door actuators to actuate to move a landing gear bay door from a closed position towards an open position. In some examples, in which one or more landing gear bay door locks are provided, the process comprises causing the one or more landing gear bay door locks to unlock the landing gear bay door beforehand. In some examples, the process comprises causing the one or more landing gear bay door actuators to actuate to move the landing gear bay door slightly further from the open position beforehand, to reduce the load on the lock(s) and thus facilitate unlocking of the lock(s). In some examples, unlocking of the lock(s), and optionally the slight movement of the landing gear bay door, may take place on the basis of one or more other criteria and/or inputs and before the controller 20 sends the at least one output.

In some examples, the landing gear bay door may be moveable from the closed position to the open position under the influence of gravity alone. In some such examples, the extension process may comprise causing one or more landing gear bay door locks to unlock the landing gear bay door, so that the landing gear bay door is free to open, without causing the one or more landing gear bay door actuators to actuate to move the landing gear bay door from the closed position towards the open position.

In some examples, the landing gear extension process may comprise causing one or more landing gear bay door locking devices to subsequently lock the landing gear bay door in the open position. In some examples, one or more landing gear bay door actuators may additionally or alternatively hold the landing gear bay door in the open position.

In some examples, the landing gear extension process comprises causing one or more landing gear actuators to actuate to move the landing gear from a retracted position towards an extended position. In some examples, in which one or more landing gear locks (not shown) are provided, the process comprises causing the one or more landing gear locks to unlock the landing gear beforehand. In some examples, the process comprises causing the one or more landing gear actuators to actuate to move the landing gear slightly further from the extended position beforehand, to reduce the load on the lock(s) and thus facilitate unlocking of the lock(s). In some examples, unlocking of the lock(s) may take place on the basis of one or more other criteria and/or inputs and before the controller 20 sends the at least one output.

In some examples, the landing gear extension process comprises causing one or more landing gear locking devices to subsequently lock the landing gear in the extended position. In some examples, the one or more landing gear actuators may additionally or alternatively hold the landing gear in the extended position.

In some examples, the landing gear extension process comprises causing movement of the landing gear from the retracted position towards the extended position, and then causing movement of a landing gear bay door from the open position towards the closed position. For example, the process may comprise causing one or more landing gear bay door actuators to move the landing gear bay door from the open position to the closed position. Thereafter, the process may comprise causing one or more landing gear bay door locks to lock the landing gear bay door in the closed position. In some examples, the one or more landing gear bay door actuators may additionally or alternatively hold the landing gear bay door in the closed position.

As will be appreciated by the skilled reader, the landing gear retraction process can take one of many forms, and may be the reverse of any suitable permutation of the above described actions of the landing gear extension process. Therefore, further detail will be omitted for brevity.

The controller 20 is also configured to determine whether at least one landing gear system 30, 40 of the one or more landing gear systems 30, 40 has failed to operate correctly in response to the at least one output. The term "failed to operate correctly" includes the at least one landing gear system 30, 40 failing to operate at all, and the at least one landing gear system 30, 40 operating to less than a predetermined degree or amount (e.g. to support the weight of the aircraft on landing, or to enable complete closure of a landing gear bay door during a landing or take-off procedure, or to enable a suitably low drag coefficient to be realised for a next flight phase after a take-off procedure). There are several different ways in which this can be implemented.

For example, the controller 20 may be configured to receive signals from one or more sensors of the aircraft, and to determine that the at least one landing gear system 30, 40 has failed to operate correctly on the basis of the one or more signals. The sensor(s) may, for example, be any one or more of the sensors 51-56 described above. The signal(s) may, for example, indicate that an element of the at least one landing gear system 30, 40, such as a landing gear, a landing gear bay door, a lock, or an actuator, is in an unexpected position, or has remained in a predetermined position, despite the output sent from the controller 20, or is experiencing a strain that is greater than a threshold strain. Alternatively or additionally, the signal(s) may indicate that an element of the at least one landing gear system 30, 40, such as a landing gear actuator, a landing gear bay door actuator, or a pipe leading thereto or therefrom, is experiencing a fluid pressure or fluid flow rate above a predetermined threshold or below a predetermined threshold. Alternatively or additionally, the signal(s) may indicate that an element of the at least one landing gear system 30, 40, such as a landing gear actuator or a landing gear bay door actuator, is drawing an electrical current above a predetermined threshold or below a predetermined threshold. The controller 20 may be configured to analyse the signals received from the sensor(s), such as by comparing data that the signals represent with predetermined stored values, such as stored in a look-up table.

Alternatively or additionally, the controller 20 may be configured to determine a period of time that has elapsed, since the controller 20 sent the at least one output, without the controller 20 receiving an indication that the at least one landing gear system 30, 40 has operated correctly. For example, the controller 20 may have a timer that is configured to time the period from when the output(s) are sent. The controller 20 may be configured to determine that the at least one landing gear system 30, 40 has failed to operate correctly when that period of time exceeds a predetermined period of time (such as between ten and thirty seconds, e.g. between twenty and thirty seconds) before the controller 20 receives an indication that the at least one landing gear system 30, 40 has operated correctly. For example, if the period of time is greater than a predetermined period of time, that equates to at least an expected period of time for the at least one landing gear system 30, 40 to complete a correct operation, the controller 20 may determine that the at least one landing gear system 30, 40 to failed to operate correctly. The predetermined period of time may be generated from a model (e.g. a look-up table or a digital twin) that factors in variables such as aircraft g level, speed, sideslip in an attempt to determine more accurate expected landing gear system operation times.

Alternatively or additionally, the controller 20 may be configured to receive respective signals indicating successful operation of each of the one or more landing gear systems 30, 40. The controller 20 may be configured to determine that the at least one landing gear system 30, 40 has failed to operate correctly, when the controller 20 has received such signals from the, or each, landing gear system 30, 40 other than the at least one landing gear system 30, 40. Alternatively, the controller 20 may be configured to determine that the at least one landing gear system 30, 40 has failed to operate correctly, when the controller 20 has failed to receive such a signal from the at least one landing gear system 30, 40 within a predetermined period of time (such as five seconds, ten seconds, twenty seconds, or thirty seconds) after receiving such signal(s) from the other landing gear system(s) 30, 40. Other implementations will be apparent to the skilled reader in view of this disclosure.

The controller 20 may be configured to cause an indication that the at least one landing gear system 30, 40 has failed to operated correctly to be output at a cockpit of the aircraft. The indication may, for example, be audible and/or visible, e.g. to the flight crew. The indication may be provided at the user interface 10 or elsewhere in the cockpit, for example.

The controller 20 is also configured to determine at least one remedial action to be taken, when the controller 20 determines that the at least one landing gear system 30, 40 has failed to operate correctly.

For example, the controller 20 may be configured to determine one or more reasons for the at least one landing gear system 30, 40 to have failed to operate correctly, and to determine the at least one remedial action to be taken on the basis of the one or more reasons. In some cases, the controller 20 is configured to determine the one or more reasons by a process comprising interrogating avionics of the aircraft, such as the avionics 60 mentioned above. This may involve the controller 20 running a process to check wiring integrity, sensor functionality, and/or landing gear system controller functionality. This may involve the controller 20 analysing Built In Test Equipment (BITE) data to determine why the at least one landing gear system 30, 40 has failed to operate correctly on the basis of a BITE function. Alternatively or additionally, the controller 20 may be configured to determine the one or more reasons by a process comprising interrogating one or more sensors of the aircraft or analysing outputs from such sensor(s), such as one or more of the sensors 51-56 discussed above.

In some cases, the controller 20 determines one or more reasons for the failure based solely on information obtained at the controller 20 from the avionics, or from one or more of the sensors, during the interrogating.

In other cases, when the controller's 20 interrogation of the avionics or of one or more sensors results in a conclusion about a status of the at least one landing gear system 30, 40 that matches a conclusion drawn by the controller 20 about the at least one landing gear system 30, 40 based on interrogation of one or more other sensors, then the controller 20 may determine a reason for the failure on the basis of that common conclusion. This reason may, for example, be failure of an actuator or a lock, a blockage in a pipe, or an obstruction to the movement of a landing gear or landing gear bay door, for example.

In contrast, when the interrogation of the avionics or of one or more sensors results in a first conclusion about the status of the at least one landing gear system 30, 40, and the interrogation of one or more other sensors results in a second, different conclusion about the status of the at least one landing gear system 30, 40, then the controller 20 may determine that there is a fault with the avionics or one or more of the sensors, and thus consequentially determine that a definitive conclusion cannot be reached by considering those elements. The controller 20 may then interrogate one or more other sensors or avionics systems to determine a firmer conclusion as to the reason for the failure. In some cases, the controller 20 may be configured to interrogate plural different permutations or combinations of the avionics and/or sensor(s), in order to determine which avionics and sensor(s) are providing reliable outputs. Other methodologies for determining one or more reasons for the failure will be apparent to the skilled reader in view of this disclosure.

It will be appreciated that enabling the controller 20 to determine the one or more reasons for the failure helps to reduce, or avoid entirely, the need for flight crew to dedicate time to troubleshooting the problem when at least one landing gear system has failed to operate correctly.

The controller 20 may be configured to cause an indication of the reason(s) that the at least one landing gear system 30, 40 has failed to operated correctly to be output at a cockpit of the aircraft. The indication may, for example, be audible and/or visible, e.g. to the flight crew.

Once the controller 20 has determined one or more reasons for the failure, the controller 20 may be configured to determine the at least one remedial action to be taken on the basis of the one or more reasons. In other words, the controller 20 may be configured to perform one or more actions for initiating actuation of a landing gear system 30, 40; and to then determine one or more processes to be initiated when the controller 20 determines that the landing gear system 30, 40 has failed to actuate correctly as a result of the one or more actions having been performed.

For example, the controller 20 may be configured to determine whether a reason for the failure may be removed by "recycling" the at least one landing gear system 30, 40 (i.e. reattempting the operation of the landing gear system 30, 40). In such a scenario, the controller 20 may determine that an appropriate remedial action would be for the controller 20 to send at least one further output for initiating operation of the one or more landing gear systems 30, 40, optionally without "recycling" one or more other landing gear systems 30, 40 of the aircraft. That is, the one or more other landing gear systems 30, 40 may be locked in position during the "recycling", for example.

In some cases, for redundancy, the aircraft has plural avionics systems and/or plural mechanical systems for causing operation of the at least one landing gear system 30, 40. The sending of the at least one output for initiating operation of the one or more landing gear systems 30, 40 may have been according to a first procedure that involves a certain one of the avionics systems and/or the mechanical systems. In some scenarios, the controller 20 may determine that a reason for the failure lies with the avionics or mechanical system, respectively, used to attempt the operation of the at least one landing gear system 30, 40. In such a scenario, the controller 20 may determine that an appropriate remedial action would be for the controller 20 to send at least one output for initiating operation of the at least one landing gear system 30, 40 according to a second procedure different to the first procedure, wherein the second procedure uses a different one of the avionics systems and/or mechanical systems.

In some scenarios, the controller 20 may determine that a reason for the failure is such that the at least one landing gear system 30, 40 is not operable, at least reliably, using the available avionics systems and/or mechanical systems. For example, there may be a fault or damage to a system that supplies power to the avionics systems and/or mechanical systems. In such a scenario, the controller 20 may determine that an appropriate remedial action would be for the controller 20 to send at least one output for initiating operation of the at least one landing gear system 30, 40 according to a second procedure, wherein the second procedure comprises operating at least a portion of the at least one landing gear system 30, 40 under the influence of gravity alone. For example, any landing gear lock(s) or landing gear bay door lock(s) may be unlocked, and thereafter the landing gear bay door (when provided) and landing gear of the at least one landing gear system 30, 40 may be permitted to free-fall to an open or extended position, respectively.

In some scenarios, the controller 20 may determine that the at least one remedial action to be taken comprises executing an aircraft manoeuvre, such as a high-G manoeuvre. This may be case, for example, when the controller 20 determines that a reason for the failure is a stuck landing gear lock or landing gear bay door lock, or a jamming of the landing gear part way through an extension or retraction procedure, or the like. Such a manoeuvre may jolt and free the lock or landing gear.

In some scenarios, the controller 20 may determine that the at least one remedial action to be taken comprises determining a flight plan. For example, this may be the case when the controller 20 determines that a reason for the failure is such that a landing gear of the at least one landing gear system 30, 40 cannot be fully retracted. This may increase the drag coefficient of the aircraft, and thus reduce its range. Accordingly, the determining of a flight plan may be such as to direct the aircraft to a more local airport than the intended destination. The more local airport may be that from which the aircraft took off.

In some scenarios, the controller 20 may determine that the at least one remedial action to be taken comprises taking one or more actions to counteract asymmetry or pitching of the aircraft. This may be so as to make the aircraft easier and/or more efficient to fly when the aircraft is airborne. For example, this may be the case when the controller 20 determines that a reason for the failure is such that a landing gear of the at least one landing gear system 30, 40 cannot be fully retracted, but all the landing gear of the one or more landing gear systems 30, 40 can be extended. In such a scenario, the remedial action may be to extend all the landing gear 30, 40 to restore symmetry. Alternatively, when fewer than all of the landing gears of the one or more landing gear systems 30, 40 can be retracted, the remedial action may be to cause operation of one or more flight control surfaces to apply yaw to counteract asymmetry of the aircraft. Alternatively, the one or more actions to counteract asymmetry of the aircraft may be to help avoid contact between the ground and a wing or engine of the aircraft when the aircraft is on the ground. For example, this may be the case when the controller 20 determines that a reason for the failure is such that a landing gear of the at least one landing gear system 30, 40 cannot be fully extended. In such a scenario, the remedial action may, for example, be to use flight controls, nose steering or brakes on extended landing gear to apply yaw to counteract asymmetry of the aircraft.

It will be appreciated that enabling the controller 20 to determine the at least one remedial action to be taken helps to reduce, or avoid entirely, the need for flight crew to spend time on such activity.

In some cases, the controller 20 is configured, in use, to cause initiation of the at least one remedial action. For example, the controller 20 may be configured to cause initiation of the at least one remedial action automatically, on the basis of the determination of the at least one remedial action to be taken. This can still further help to reduce, or avoid entirely, the need for flight crew to spend time on such activity. For example, in some cases, the only action required by the flight crew (e.g. the pilot) might be to use the user interface 10 to input the landing gear system operation request. Thereafter, the controller 20 may determine that at least one landing gear system 30, 40 has failed to operate correctly, and may determine and implement at least one remedial action to be taken thereafter without further involvement of the flight crew.

Alternatively or additionally, the controller 20 may be configured, in use, to cause identification of the at least one remedial action to be output at a cockpit of the aircraft, such as at the remedial action identifier 70 mentioned above. The identification may, for example, be audible and/or visible, e.g. to the flight crew. This can alert the flight crew to the problem, and either advise them of remedial action(s) they should take or forewarn them about remedial actions the controller 20 has taken, is taking, or will take, or prompt them to approve taking of the remedial action(s). For example, in some such scenarios, the user interface 10 may be operable by a user to manually input a request to perform the at least one remedial action, and the controller 20 may be configured, in use, to receive a signal from the user interface 10 indicative of user-operation of the user interface 10 to input the request to perform the at least one remedial action, and to cause initiation of the at least remedial action on the basis of the signal. It will be appreciated that such functionality enables the user (e.g. the pilot) to retain authority for operating the landing gear system(s) 30, 40. In some cases, only one remedial action may be indicated, so as to avoid the flight crew having to make a decision about which remedial action to take during a high workload flight phase. However, in other cases, plural available remedial actions may be indicated, so as to enable the flight crew to maintain authority for choosing the action to be taken.

Figure 2:
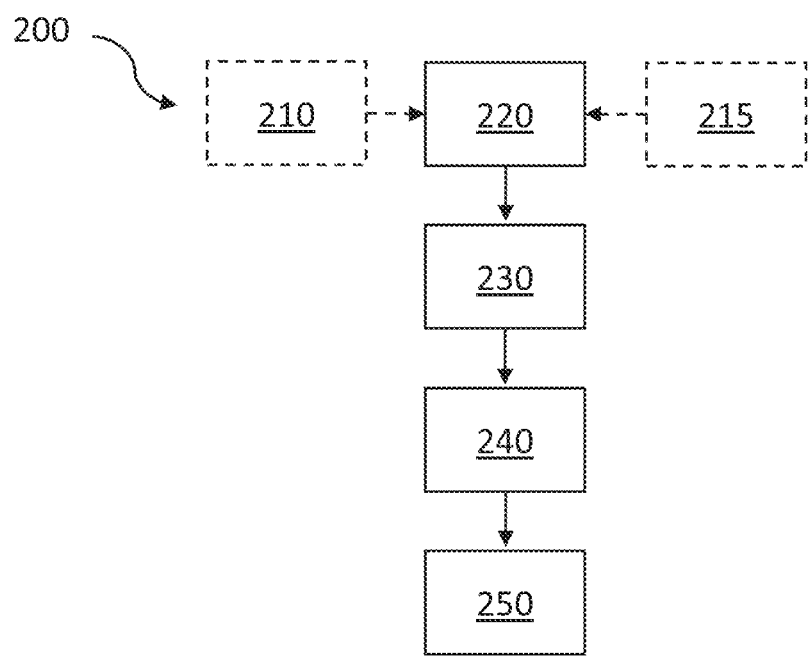
FIG. 2 is a flow diagram showing an example of a method of controlling one or more landing gear systems of an aircraft using a controller of the aircraft.

FIG. 2 is a flow diagram showing an example of a method of controlling one or more landing gear systems of an aircraft using a controller of the aircraft. The method 200 comprises: determining 220 that the one or more landing gear systems are to be operated. This determining 220 may be as a result of the controller 20 receiving 210 one or more inputs from one or more sensors. Alternatively or additionally, the determining 220 may be as a result of the controller 20 receiving 215 from a user interface an input indicative of user-operation of the user interface to input a landing gear system operation request.

The method also comprises issuing 230 at least one output for causing operation of the one or more landing gear systems, determining 240 whether at least one of the one or more landing gear systems has failed to operate correctly in response to the at least one output, and determining 250 at least one remedial action to be taken, when the controller determines that the at least one landing gear system has failed to operate correctly in response to the at least one output.

Any one or more of the further processes discussed above may be included in the method in different examples. The method 200 may be performed by the controller 20 discussed herein. The user interface may be the user interface 10 discussed herein.

Figure 3:
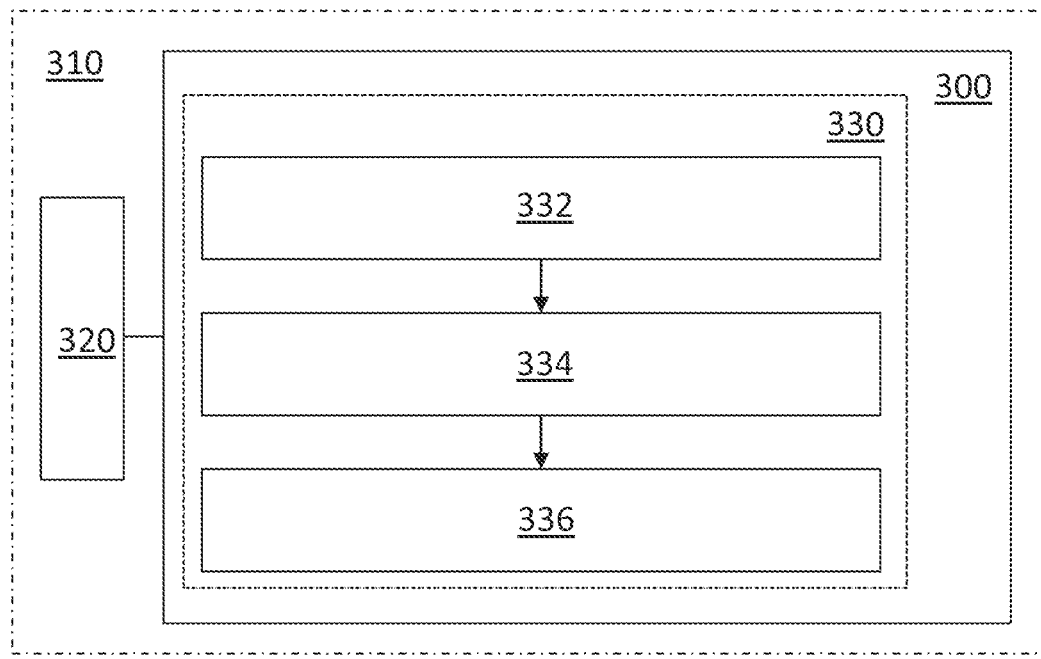
FIG. 3 is a schematic diagram of an example of a non-transitory computer-readable storage medium.

FIG. 3 shows a schematic diagram of a non-transitory computer-readable storage medium 300 according to an embodiment of the present invention. The non-transitory computer-readable storage medium 300 stores instructions 330 that, if executed by a processor 320 of a controller 310 of an aircraft, cause the processor 320 to perform one of the methods described herein. In some embodiments, the controller 310 is the controller 20 described above with reference to FIG. 1 or a variant thereof described herein. The instructions 330 comprise: issuing 332 at least one output for causing operation of the one or more landing gear systems; determining 334 whether at least one of the one or more landing gear systems has failed to operate correctly in response to the at least one output; and determining 336 at least one remedial action to be taken, when the controller determines that the at least one landing gear system has failed to operate correctly in response to the at least one output. The instructions 330 may comprise instructions to perform any of the methods 200 described above with reference to FIG. 2.

Figure 4:
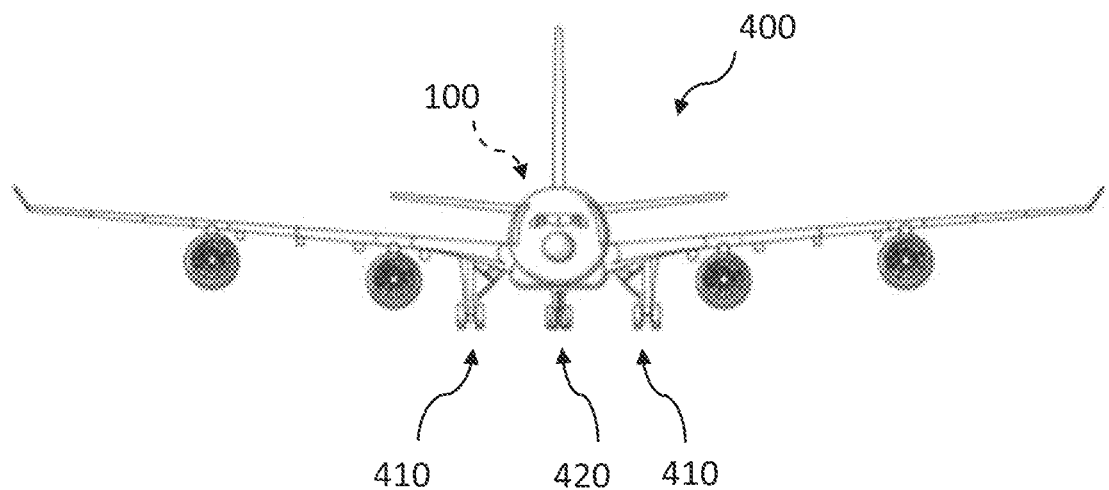
FIG. 4 is a schematic front view of an example of an aircraft.

FIG. 4 is a schematic front view of an aircraft 400. The aircraft 400 comprises two main landing gears 410 and a nose landing gear 420, but in other examples more landing gears may be included. The aircraft 400 also comprises an aircraft landing gear control system 100 as discussed herein, such as the system 100 discussed herein with reference to FIG. 1. A controller of the aircraft landing gear control system 100 may be operatively connected to all of the landing gears 410, 420 or just to one or some of the landing gears, such as the main landing gears 410. The aircraft 400 may comprise the non-transitory computer-readable storage medium 300 discussed above with reference to FIG. 3, or any variant thereof discussed herein.

It is to be noted that the term "or" as used herein is to be interpreted to mean "and/or", unless expressly stated otherwise.

The above embodiments are to be understood as non-limiting illustrative examples of how the present invention, and aspects of the present invention, may be implemented. Further examples of the present invention are envisaged. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the present invention, which is defined in the accompanying claims.

The invention claimed is:

1. An aircraft landing gear control system configured to be operably connected to one or more landing gear systems of an aircraft, the aircraft landing gear control system comprising a controller that is configured to:
   send at least one output for initiating operation of the one or more landing gear systems;
   determine whether at least one landing gear system of the one or more landing gear systems has failed to operate correctly in response to the at least one output; and
   determine at least one remedial action to be taken when the controller determines that the at least one landing gear system has failed to operate correctly;
   determine one or more reasons for the at least one landing gear system to have failed to operate correctly; and
   determine the at least one remedial action to be taken, on the basis of the one or more reasons.

2. The aircraft landing gear control system according to claim 1, wherein the controller is configured to:
   determine the one or more reasons by a process comprising interrogating avionics of the aircraft.

3. The aircraft landing gear control system according to claim 1, wherein the controller is configured to:
   determine the one or more reasons by a process comprising interrogating one or more sensors of the aircraft.

4. The aircraft landing gear control system according to claim 1, wherein the controller is configured to:
   cause identification of the at least one remedial action to be output at a cockpit of the aircraft.

5. The aircraft landing gear control system according to claim 1, wherein the controller is configured to:
   cause initiation of the at least one remedial action.

6. The aircraft landing gear control system according to claim 1, wherein the controller is configured to:
   cause initiation of the at least one remedial action automatically, on the basis of the determination of the at least one remedial action to be taken.

7. The aircraft landing gear control system according to claim 1, and further comprising:
   a user interface operable by a user to manually input a request to perform the at least one remedial action;
   wherein the controller is communicatively coupled to the user interface and is configured to:
   receive, from the user interface, a signal indicative of user-operation of the user interface to input the request to perform the at least one remedial action; and
   cause initiation of the at least remedial action, on the basis of the signal.

8. The aircraft landing gear control system according to claim 1, wherein the at least one remedial action to be taken comprises one or more of:
   determining a flight plan;
   executing an aircraft manoeuvre;
   reattempting operation of the at least one landing gear system; and
   taking one or more actions to counteract asymmetry or pitching of the aircraft.

9. The aircraft landing gear control system of claim 1, wherein the controller determines the one or more reasons by selecting the one or more reasons from a plurality of reasons stored in memory accessible by the controller, and
   wherein the controller determines the one or more remedial actions by selecting the one or more remedial actions from a plurality of remedial actions stored in the memory accessible by the controller.

10. The aircraft landing gear control system of claim 9, wherein, the plurality of reasons stored in the memory include a plurality of: (i) an unexpected position of a landing gear, a landing gear bay door lock, a lock and/or an actuator, (ii) a fluid pressure and/or fluid flow rate of hydraulics in the one or more landing gear systems being above or below a predetermined fluid value; (iii) electrical current drawn by the one or more landing gear systems exceeding a predetermined current value; and (iv) a failure in a sensor for the one or more landing gear systems.

11. The aircraft landing gear control system of claim 9, wherein the plurality of remedial actions includes a plurality of: (i) recycling the one or more landing gear systems; (ii) using alterative avionics and/or mechanical systems of the one or more landing gear systems; (iii) deploying the one or more landing gear systems using gravity alone; (iv) executing a high-G aircraft manoeuver; (v) changing a flight plan of the aircraft, and (vi) deploying the one or more landing gear systems to achieve a symmetry of the landing gear systems.

12. An aircraft landing gear control system configured to be operably connected to one or more landing gear systems of an aircraft, the aircraft landing gear control system comprising a controller that is configured to:
   send at least one output for initiating operation of the one or more landing gear systems;
   determine whether at least one landing gear system of the one or more landing gear systems has failed to operate correctly in response to the at least one output;
   determine at least one remedial action to be taken when the controller determines that the at least one landing gear system has failed to operate correctly;
   send the at least one output for initiating operation of the one or more landing gear systems according to a first procedure; and
   determine at least one remedial action to be taken that comprises sending at least one output for initiating operation of the at least one landing gear system according to a second procedure different to the first procedure.

13. The aircraft landing gear control system according to claim 12, wherein the second procedure comprises one or more of:

operating at least a portion of the at least one landing gear system under the influence of gravity alone;

operating the at least one landing gear system using avionics that are different to avionics used to operate the at least one landing gear system according to the first procedure; and actuating the at least one landing gear system using mechanics that are different to mechanics used to actuate the at least one landing gear system according to the first procedure.

14. A method of controlling one or more landing gear systems of an aircraft using a controller of the aircraft, the method comprising:

the controller issuing at least one output for causing operation of the one or more landing gear systems;

the controller determining whether at least one of the one or more landing gear systems has failed to operate correctly in response to the at least one output; and the controller determining at least one remedial action to be taken, when the controller determines that the at least one landing gear system has failed to operate correctly in response to the at least one output;

the controller determining one or more reasons for the at least one landing gear system to have failed to have operated correctly; and the controller determining the at least one remedial action to be taken on the basis of the one or more reasons.

15. The method according to claim 14, further comprising:

the controller receiving signals from one or more sensors of the aircraft; and the controller determining that the at least one landing gear system has failed to operate correctly on the basis of the one or more signals.

16. The method according to claim 14, further comprising:

the controller determining a period of time that has elapsed, since the controller issued the at least one output, without the controller receiving an indication that the at least one landing gear system has operated correctly; and the controller determining that the at least one landing gear system has failed to operate correctly on the basis of the period of time determined.

17. The method according to claim 14, further comprising:

the controller determining that the one or more landing gear systems are to be operated on the basis of one or more inputs received at the controller from one or more sensors.

18. The method according to claim 14, further comprising:

the controller receiving from a user interface an input indicative of user-operation of the user interface to input a landing gear system operation request; and the controller determining that the one or more landing gear systems are to be operated on the basis of the input.

19. The method according to claim 14, wherein the operation of the one or more landing gear systems comprises extension of the one or more landing gears or retraction of the one or more landing gears.

20. A controller for an aircraft landing gear control system, wherein the controller is configured to:

perform one or more actions for initiating actuation of a landing gear system; and then determine one or more processes to be initiated, when the controller determines that the landing gear system has failed to actuate correctly as a result of the one or more actions having been performed;

determine one or more reasons for the at least one landing gear system to have failed to actuate correctly; and determine the one or more processes to be initiated on the basis of the one or more reasons.

* * * * *